(12) United States Patent
Fujimoto et al.

(10) Patent No.: US 7,206,074 B2
(45) Date of Patent: Apr. 17, 2007

(54) APPARATUS AND METHOD FOR MEASURING SPECTRAL REFLECTANCE AND APPARATUS FOR MEASURING FILM THICKNESS

(75) Inventors: Hiroki Fujimoto, Kyoto (JP); Noriyuki Kondo, Kyoto (JP); Eiji Nishihara, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 163 days.

(21) Appl. No.: 11/057,216

(22) Filed: Feb. 15, 2005

(65) Prior Publication Data

US 2005/0206907 A1   Sep. 22, 2005

(30) Foreign Application Priority Data

Mar. 19, 2004   (JP) .......................... P2004-079409

(51) Int. Cl.
*G01B 9/02* (2006.01)
*G01B 11/02* (2006.01)
*G01B 11/06* (2006.01)
*G01J 3/45* (2006.01)

(52) U.S. Cl. .................. 356/456; 356/503; 356/632

(58) Field of Classification Search ................ 356/454, 356/456, 503, 630–632
See application file for complete search history.

(56) References Cited

U.S. PATENT DOCUMENTS 5,517,575 A * 5/1996 Ladewski ................... 382/108
2002/0149546 A1* 10/2002 Ben-Chorin et al. .......... 345/32
2004/0010375 A1* 1/2004 Schomacker et al. ......... 702/19

(Continued)

FOREIGN PATENT DOCUMENTS

JP    05322657    * 12/1993

(Continued)

OTHER PUBLICATIONS

"Spectroscopy Handbook: 2.10.2 A Specific optical problem on microscopic measuring method." edited by Shigeo Minami and Youichi Goushi, Published by Asakura Shoten, 1990, pp. 213-214 (English Translation Attached).

*Primary Examiner*—Gregory J. Toatley, Jr.
*Assistant Examiner*—Patrick Connolly
(74) *Attorney, Agent, or Firm*—McDermott Will & Emery LLP

(57) ABSTRACT

A film thickness measurement apparatus has an image pickup part (32) for acquiring a plurality of single-band images corresponding to a plurality of wavelengths, and the image pickup part (32) acquires a plurality of reference single-band images representing a pattern on a reference substrate. A correction factor setting part (51) performs setting of a plurality of correction factors in accordance with distances from a specified pixel by using a plurality of reference single-band images. Subsequently, the image pickup part (32) acquires a plurality of measurement single-band images representing a pattern on an objective substrate and corrects a value of the specified pixel for each of a plurality of measurement single-band images by using the value of the specified pixel and values of pixels surrounding the specified pixel and the correction factors. A spectral reflectance calculation part (52) thereby calculates a reflectance at a measurement point on the objective substrate which corresponds to the specified pixel on the basis of the corrected value of the specified pixel with high accuracy.

20 Claims, 7 Drawing Sheets

U.S. PATENT DOCUMENTS

| | | | |
|---|---|---|---|
| 2004/0206882 A1* | 10/2004 | Banks et al. | 250/201.2 |
| 2004/0206913 A1* | 10/2004 | Costa et al. | 250/458.1 |
| 2004/0206914 A1* | 10/2004 | Schomacker et al. | 250/458.1 |
| 2004/0207625 A1* | 10/2004 | Griffin et al. | 345/440 |
| 2004/0208385 A1* | 10/2004 | Jiang | 382/254 |
| 2004/0208390 A1* | 10/2004 | Jiang et al. | 382/260 |
| 2004/0209237 A1* | 10/2004 | Flewelling et al. | 435/4 |
| 2005/0240090 A1* | 10/2005 | Ruchti et al. | 600/316 |
| 2006/0012808 A1* | 1/2006 | Mizukura et al. | 358/1.9 |

FOREIGN PATENT DOCUMENTS

| | | | |
|---|---|---|---|
| JP | 10-142053 | | 5/1998 |
| JP | 2001022930 | * | 1/2001 |
| JP | 2005265655 | * | 9/2005 |

* cited by examiner

F I G. 14A
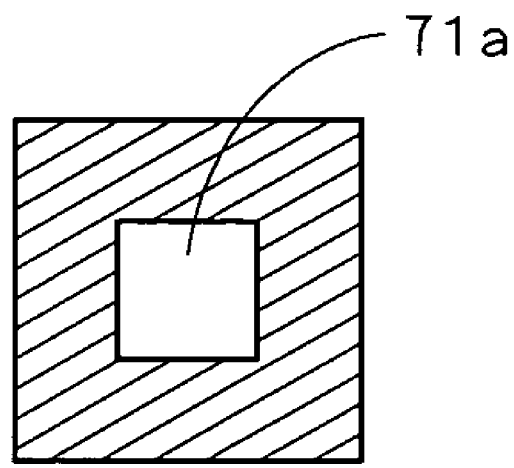
F I G. 14B
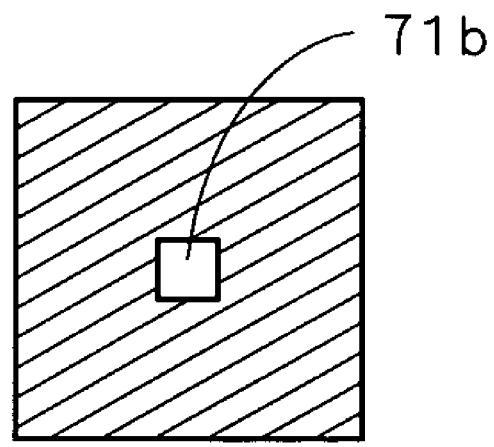

APPARATUS AND METHOD FOR MEASURING SPECTRAL REFLECTANCE AND APPARATUS FOR MEASURING FILM THICKNESS

BACKGROUND OF THE INVENTION

1. Field of the Invention

The present invention relates to a technique for measuring spectral reflectance of a measurement object and a technique for measuring a thickness of a film (or thicknesses of films) formed on a measurement object.

2. Description of the Background Art

In order to ensure consistent quality of semiconductor products, it is usual to measure thicknesses of films (e.g., layered thin films) formed on a semiconductor substrate (hereinafter, referred to as "substrate") in an inspection step of a semiconductor manufacturing process. For measurement of film thicknesses, a film thickness measurement apparatus has been conventionally used, adopting a light interferometric method where film thicknesses are calculated on the basis of spectral reflectance obtained by emitting white light to a substrate and performing spectrometric analysis of the light reflected on the substrate.

Japanese Patent Application Laid Open Gazette No. 10-142053 (Document 1) discloses a technique for obtaining spectral reflectance where an image of a sample in which a white area is surrounded by a black area is picked up by irradiating the sample with white light, to obtain a flare spread function on flare light which affects pixels corresponding to the black area on the sample image from the white area and then an influence of the flare light on a color patch from other color patches in an image of a color chart is removed by using the flare spread function.

In recent years, however, another technique has been attempted, for obtaining spectral reflectance on the basis of a plurality of single-band images (so-called, "a multiband image") corresponding to a plurality of wavelengths, which are acquired by sequentially emitting lights of a plurality of different wavelengths to a substrate. Since a pixel value in a single-band image which corresponds to a predetermined measurement point on a substrate is affected by wraparound of light from its surrounding area (in other words, stray light in the S-V effect), however, it is necessary to block the light in an unnecessary area with a member having a pinhole in order to measure spectral reflectance with high accuracy, and therefore it is impossible to obtain a reflectance on the basis of an image with accuracy. According to "Spectroscopy Handbook" edited by Shigeo Minami and Youichi Goushi (published by Asakura Shoten, 1990, pp. 213–214), the S-V effect refers to a phenomenon where the apparent photometric quantity increases due to the flare light caused by an optical system and the like in a measurement apparatus to cause some photometric errors.

The technique of Document 1, where the spectral reflectance of each color patch is measured, assuming that the influence of the flare light caused by a white area in a sample on pixels corresponding to a black area surrounding the white area and the influence of the flare light caused by a color patch in a color chart on pixels corresponding to other color patches in an image are equated with each other, also disadvantageously causes degradation in accuracy of measurement.

SUMMARY OF THE INVENTION

The present invention is intended for a spectral reflectance measurement apparatus for measuring spectral reflectance of a measurement object, and it is an object to measure spectral reflectance of a measurement object with high accuracy.

According to an aspect of the present invention, the spectral reflectance measurement apparatus comprises an image pickup part for picking up an image of an object to acquire a plurality of single-band images corresponding to a plurality of wavelengths, a correction factor setting part for setting a plurality of correction factors in accordance with distances from a specified pixel by using a plurality of reference single-band images of a reference object which are acquired by the image pickup part, and a spectral reflectance calculation part for obtaining a corrected value of a specified pixel for each of a plurality of measurement single-band images of a predetermined area on a measurement object which are acquired by the image pickup part, by using a value of the specified pixel, values of pixels surrounding the specified pixel and the plurality of correction factors and calculating a reflectance of a position on the measurement object which corresponds to the specified pixel on the basis of the corrected value.

The spectral reflectance measurement apparatus of the present invention makes it possible to measure spectral reflectance of a measurement object on the basis of a plurality of single-band images with high accuracy.

Preferably, calculation to obtain the plurality of correction factors is performed, where it is assumed, in each of the plurality of reference single-band images, that the plurality of correction factors are unknown, by substantially multiplying each of an already-known corrected value of the specified pixel and values of pixels surrounding the specified pixel by one of the plurality of correction factors to obtain an equation where the sum of a plurality of multiplication results is assumed to be a value of the specified pixel and then solving simultaneous equations obtained from the plurality of reference single-band images.

The plurality of reference single-band images may be images representing a predetermined pattern on the reference object in different wavelengths and it is therefore possible to measure spectral reflectance on the predetermined pattern with high accuracy.

The plurality of reference single-band images may be different images representing different patterns in one wavelength and in this case, the correction factor setting part performs setting of the plurality of correction factors for each wavelength and the spectral reflectance calculation part selects correction factors to be used in calculation in accordance with the wavelength of a measurement single-band image. Therefore, it is possible to measure spectral reflectance without depending on a pattern.

The present invention is also intended for a spectral reflectance measurement method for measuring spectral reflectance of a measurement object, and the present invention is further intended for an apparatus and a method for measuring the thickness of a film (or thicknesses of films) formed on a measurement object, to which the spectral reflectance measurement apparatus and the spectral reflectance measurement method are applied.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 14A and 14B are views illustrating patterns on a substrate.

DESCRIPTION OF THE PREFERRED EMBODIMENTS

Figure 1:
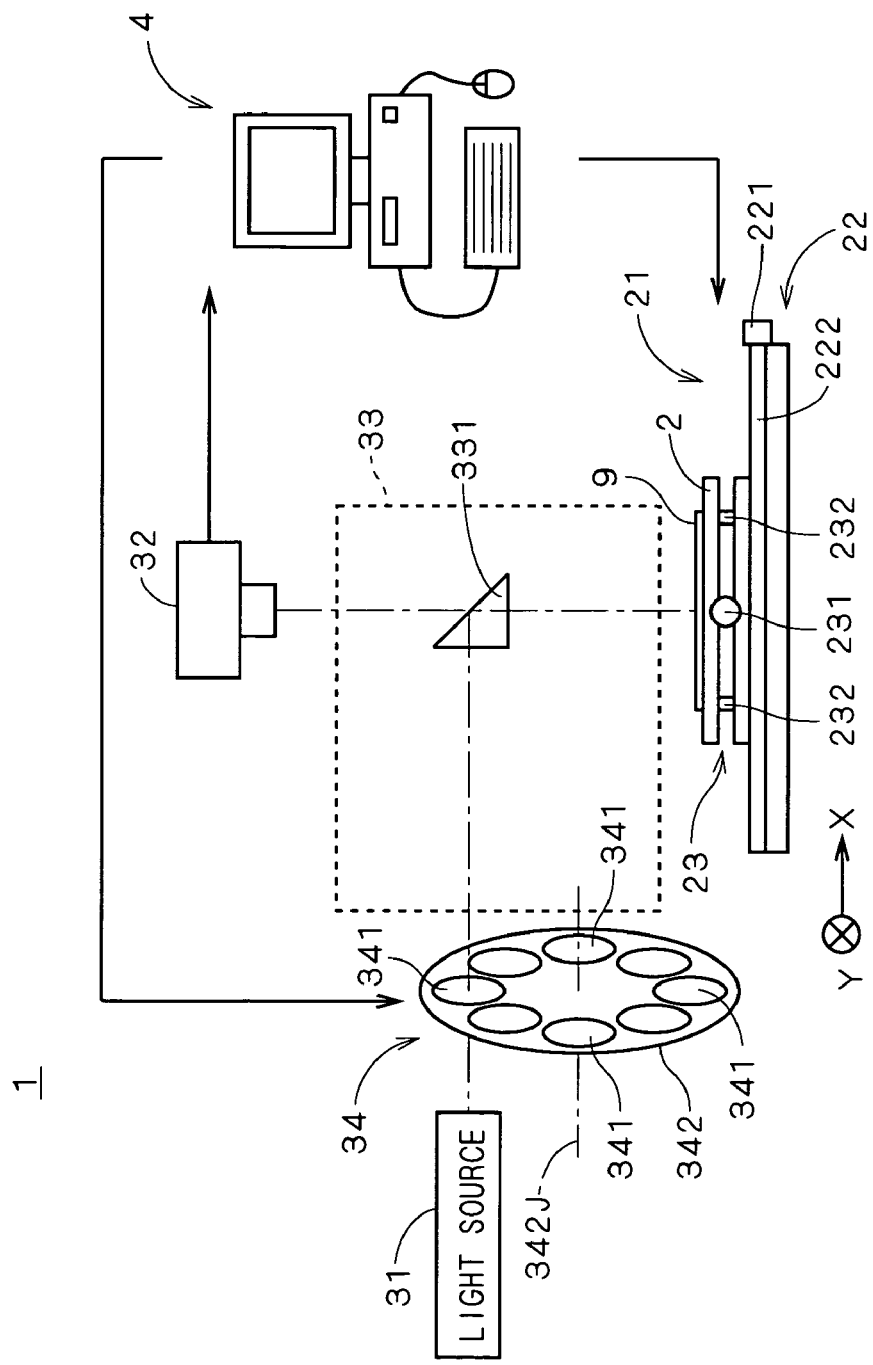
FIG. 1 is a view showing a construction of a film thickness measurement apparatus.

FIG. 1 is a view showing a construction of a film thickness measurement apparatus 1 in accordance with one preferred embodiment of the present invention. The film thickness measurement apparatus 1 comprises a stage 2 for holding a substrate 9 (e.g., a semiconductor substrate formed of Si (silicon)) with a thin film which is formed on its surface, a stage moving mechanism 21 for moving the stage 2 in X and Y directions of FIG. 1, a light source 31 for emitting light of multiple wavelengths (e.g., white light), an image pickup part 32 for picking up an image of the substrate 9, an optical system 33 for guiding light from the light source 31 onto the substrate 9 and guiding light reflected on the substrate 9 to the image pickup part 32 and a filter unit 34 having a plurality of filters 341 for transmitting lights of a plurality of different wavelengths (exactly, a plurality of lights included in a plurality of different wavelength bands). Though only a prism 331 is shown in FIG. 1 as an optical element in the optical system 33, actually, various optical elements such as lenses and mirrors are provided in the optical system 33 as necessary.

In the filter unit 34, a plurality of filters 341 are attached to a wheel 342 rotated about an axis 342J by a not-shown motor, and with rotation of the wheel 342, one of the filters 341 is selectively disposed on an optical path leading from the light source 31 to the substrate 9 (an optical path leading from the light source 31 to the prism 331 in FIG. 1). A limited light out of light from light source 31 which pass through the selected filter 341 is emitted onto the substrate 9 and the reflected light is received by the image pickup part 32. The image pickup part 32 thereby acquires a single-band image of the substrate 9 irradiated with the light of wavelength passing through the selected filter 341. In the filter unit 34, respective single-band images corresponding to the filters 341 are appropriately acquired by the image pickup part 32 since respective transmittances of the filters are adjusted in accordance with the spectral intensity of light emitted from the light source 31 so that the intensities of respective lights passing through the filters 341 should be constant.

The stage moving mechanism 21 has an X-direction moving mechanism 22 for moving the stage 2 in the X direction of FIG. 1 and a Y-direction moving mechanism 23 for moving the stage 2 in the Y direction of FIG. 1. The X-direction moving mechanism 22 has a motor 221 to which a ball screw (not shown) is connected and with rotation of the motor 221, the Y-direction moving mechanism 23 moves along guide rails 222 in the X direction of FIG. 1. The Y-direction moving mechanism 23 has the same structure as the X-direction moving mechanism 22 has, and with rotation of a motor 231, the stage 2 is moved along guide rails 232 in the Y direction of FIG. 1 with a ball screw (not shown).

The film thickness measurement apparatus 1 further comprises a computer 4 to which data of single-band images acquired by the image pickup part 32 is inputted. The film thickness measurement apparatus 1 obtains spectral reflectance of the substrate 9 which is calculated by the computer 4 on the basis of the single-band image data and acquires the thickness of a film (or thicknesses of films) formed on the substrate 9 on the basis of the spectral reflectance. The computer 4 also serves as a control part for controlling the constituent elements of the film thickness measurement apparatus 1.

Figure 2:
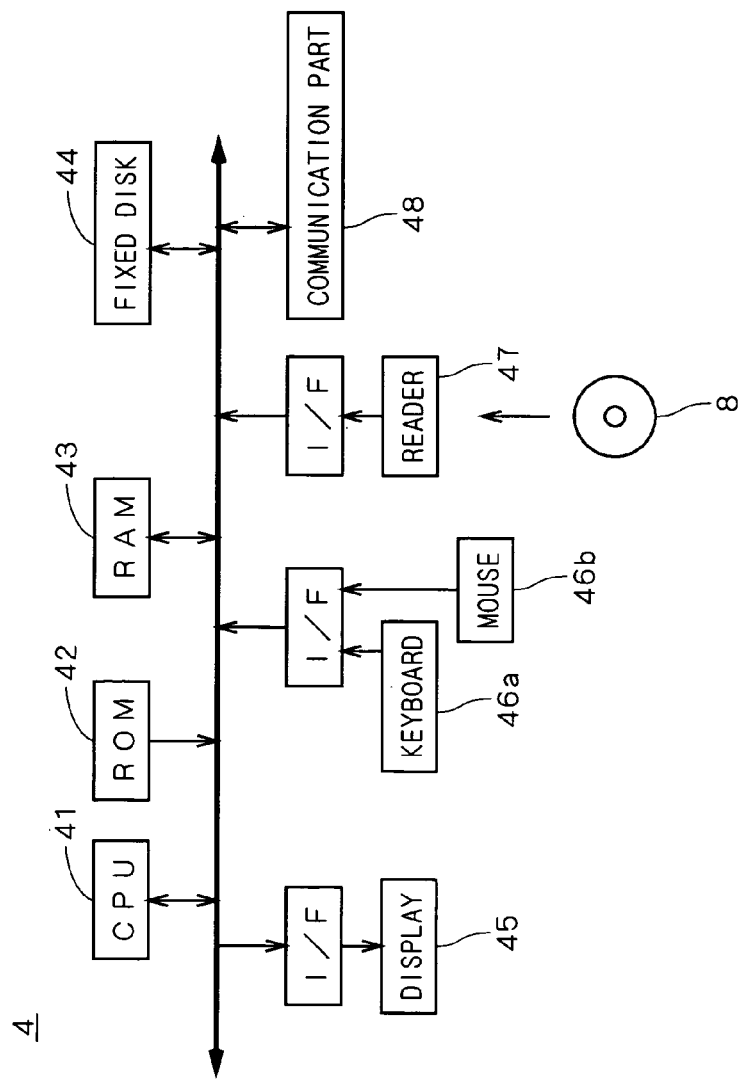
FIG. 2 is a diagram showing a construction of a computer.

FIG. 2 is a diagram showing a construction of the computer 4. The computer 4 has a constitution of general computer system, as shown in FIG. 2, where a CPU 41 for performing various computations, a ROM 42 for storing a basic program and a RAM 43 for storing various information are connected to a bus line. To the bus line, a fixed disk 44 for storing information, a display 45 for displaying various information such as images, a keyboard 46a and a mouse 46b for receiving an input from a user, a reader 47 for reading information from a computer-readable recording medium 8 such as an optical disk, a magnetic disk, a magneto-optic disk or the like, and a communication part 48 for transmitting and receiving a signal to/from other constituent elements in the film thickness measurement apparatus 1 are further connected through an interface (I/F) as appropriate.

Figure 3:
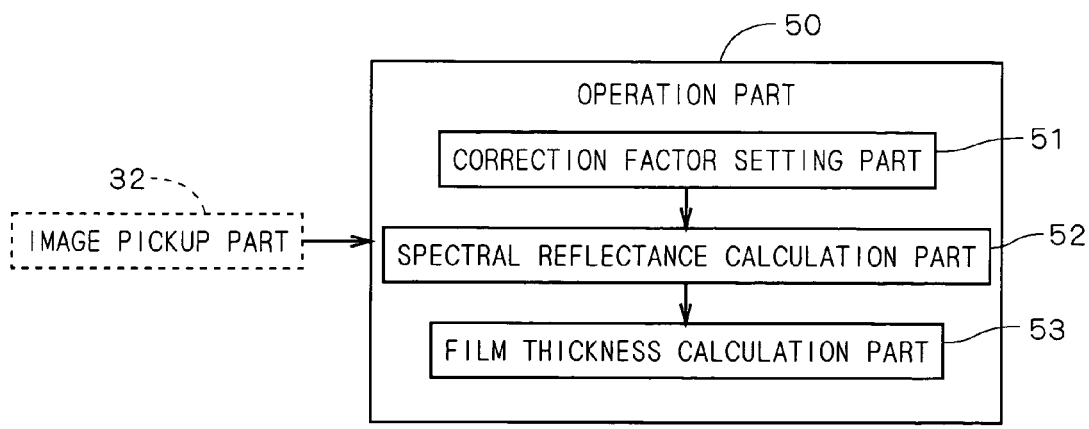
FIG. 3 is a block diagram showing a functional structure implemented by the computer.

FIG. 3 is a block diagram showing a structure of functions implemented by the CPU 41, the ROM 42, the RAM 43, the fixed disk 44 and the like in the computer 4, and in FIG. 3, constituent elements of an operation part 50 represent the functions implemented by the CPU 41 and the like. The function of the operation part 50 may be implemented by dedicated electric circuits, or may be partially implemented by the dedicated electric circuits.

Figure 4:
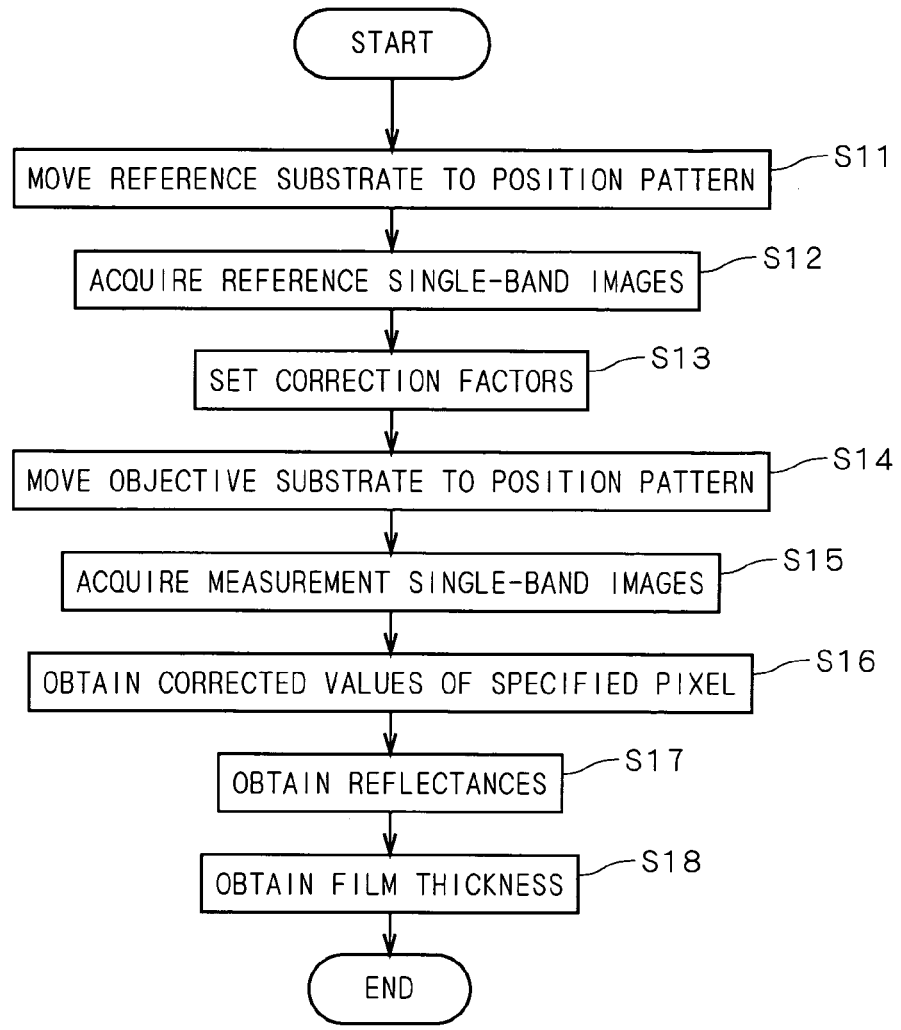
FIG. 4 is flowchart showing an operation flow for measuring the thickness of a film on a substrate.

FIG. 4 is a flowchart showing an operation flow of the film thickness measurement apparatus 1 for measuring the thickness of a film on the substrate 9. In the film thickness measurement apparatus 1, first, a substrate 9 serving as a reference (hereinafter, referred to as "reference substrate 9a"), which has the same film structure and the same pattern as those of a substrate to be measured as described later is put on the stage 2. As to the reference substrate 9a, the information on a film which is layered thereon, indicating physical properties, a film thickness and the like (specifically, a supposed film thickness and optical constants (refractive index n and extinction coefficient k) are known.

Figure 5:
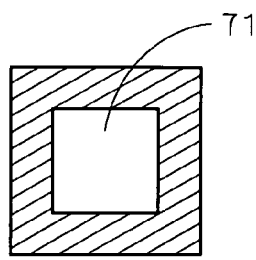
FIG. 5 is a view illustrating a pattern on a substrate.

For example, a rectangular pattern 71 illustrated in FIG. 5 (e.g., a pattern formed of Cu (copper)) is formed on the reference substrate 9a, a predetermined filter 341 is selected in the filter unit 34 of FIG. 1 and a single-band image of the pattern is acquired by the image pickup part 32. Then, the computer 4 controls the stage moving mechanism 21 on the basis of the acquired single-band image to move the reference substrate 9a so that the pattern 71 can be positioned at the center of an image pickup area of the image pickup part 32 (Step S11). In other words, the center of the pattern 71 on the reference substrate 9a is adjusted to a position corresponding to a central pixel (hereinafter, referred to as "specified pixel") in the single-band image. When the reference substrate 9a is positioned on the basis of the single-band image, the computer 4 performs pattern matching as necessary.

After the reference substrate 9a is positioned, a filter 341 for transmitting a light of a wavelength is selected and a single-band image (hereinafter, referred to as "reference single-band image") of a predetermined area including the pattern 71 on the reference substrate 9a is acquired in the image pickup part 32 by irradiating the reference substrate 9a with the light of this wavelength. Subsequently, the filter unit 34 selects a filter 341 for transmitting a light of another wavelength different from the wavelength of the already-emitted light and another reference single-band image is thereby acquired. The above operations are thus repeated to acquire a plurality of reference single-band images in the different wavelengths, which represent the pattern 71 on the reference substrate 9a (Step S12).

Next, a plurality of correction factors in accordance with distances from the specified pixel are calculated by using the acquired reference single-band images, and a correction factor setting part 51 in the operation part 50 of FIG. 3 performs setting of the correction factors (Step S13). The correction factors refer to factors for correcting an influence of the S-V effect in the single-band image caused by the optical system 33 and the like, which is used in a calculation discussed later for obtaining spectral reflectance.

Figures 6, 7:
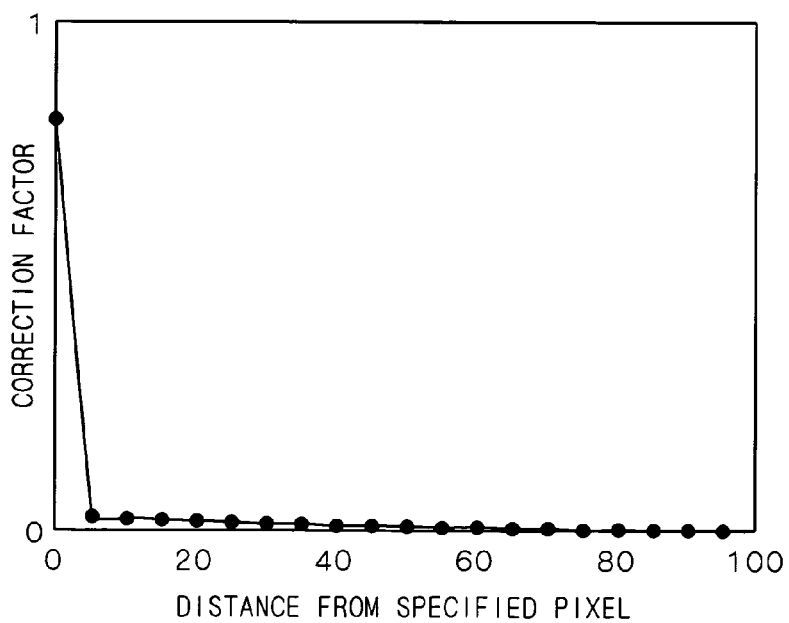
FIG. 6 is a view showing a pixel array of a single-band image.
FIG. 7 is a graph showing a relation between a correction factor and a distance from a specified pixel.

FIG. 6 is a view showing a pixel array of a single-band image 6. In FIG. 6, a thick line represents an outline of the specified pixel and values of pixels represent respective distances from the specified pixel. FIG. 7 is a graph showing a relation between a correction factor and a distance from the specified pixel. In the film thickness measurement apparatus 1, a plurality of pixels in the single-band image 6 which are present at almost the same distance away from the specified pixel (specifically, a plurality of pixels having the same value in FIG. 6) are used as one set (hereinafter, referred to as "a zone"), and a correction factor is obtained for each of the zones and the specified pixel. In the present preferred embodiment, the correction factor for the specified pixel is the maximum as shown in FIG. 7 and the farther a zone is located away from the specified pixel, the smaller its correction factor is. Then, the correction factor setting part 51 sets the calculated correction factors in a spectral reflectance calculation part 52. Detailed discussion on the calculation for obtaining the correction factors will be made later.

After the correction factors are set, the reference substrate 9a is removed and the substrate 9 to be measured (hereinafter, referred to as "objective substrate 9"), which has the same rectangular pattern 71 as shown in FIG. 5 like in the reference substrate 9a, is put onto the stage 2. The objective substrate 9 is moved on the basis of the single-band image (which can be an image in a case where the filter 341 is not disposed on the optical path) which is acquired by the image pickup part 32, and the center of the pattern 71 which is a measurement point on the objective substrate 9 is positioned at the center of the image pickup area of the image pickup part 32 (Step S14). Then, one of the filters 341 is disposed on the path of light emitted from the light source 31 and a single-band image of a predetermined area including the pattern 71 on the objective substrate 9 (hereinafter, referred to as "measurement single-band image") is acquired (Step S15).

After a plurality of measurement single-band images corresponding to a plurality of wavelengths are acquired with a plurality of filters 341 sequentially changed, subsequently, the spectral reflectance calculation part 52 performs calculation of reflectances.

Herein, a general method of calculating a reflectance will be discussed. First, for preparation, single-band images of a calibration substrate (e.g., Si (silicon)) on which no pattern is formed (hereinafter, referred to as "calibration single-band images") are acquired with lights of wavelengths corresponding to the filters 341. An image representing an output from the image pickup part 32 in a state where no light is emitted from the light source 31 (specifically, an image acquired by capturing an output of an image pickup element (e.g., CCD) in the image pickup part 32 in a state where light is shut out, which is hereinafter referred to as "dark image") is also acquired. Then, assuming that a value of each pixel in each image represents the light quantity and each pixel value of a measurement single-band image in a wavelength is represented by Meas, a pixel value in a calibration single-band image of the same wavelength is represented by Calib and a pixel value corresponding to the dark image is represented by Dark, the reflectance (represented by Ref) of a light of a wavelength at a position on the objective substrate 9 which corresponds to a pixel in the measurement single-band image is expressed as Eq. 1, where the reflectance may be expressed as a percent:

$$Ref = \frac{Meas - Dark}{Calib - Dark} \qquad \text{Eq. 1}$$

In Eq. 1, since a relative reflectance is obtained by using the calibration single-band image, even if the output from the light source 31 changes with time, the effect on the calculated reflectance can be suppressed by acquiring the calibration single-band image (in other words, performing calibration) every a given period of time.

Figure 8:
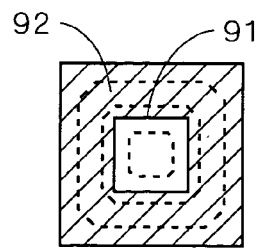
FIG. 8 is a view for explaining wraparound of light from a surrounding area.

On the other hand, a light entering a position in an image pickup surface of the image pickup part 32 which corresponds to a specified pixel (or a measurement point) includes a light reflected on a measurement point and lights reflected on points surrounding the measurement point (hereinafter, referred to as "surrounding points") as well due to the S-V effect. For example, as shown in FIG. 8, when a single-band image of a rectangular area on a substrate is acquired, as indicated by broken lines, light from the rectangular area on the substrate affects an area 92 surrounding a rectangular area 91 (i.e., surrounding area 92) in the single-band image and light from a surrounding area on the substrate also affects the rectangular area 91 in the single-band image. Therefore, it can be thought that the incident light quantity at the position which corresponds to a value of the specified pixel in the single-band image is the sum of products (multiplication results) obtained by multiplying each of actual reflected-light quantities (hereinafter, referred to as "true reflected-light quantities") at the measurement point and the surrounding points by one of the correction factors in accordance with a distance from the measurement point, and a true (relative) reflectance at the measurement point can be obtained by performing the calculation of Eq. 1 on the basis of the true reflected-light quantities.

Hereinafter, detailed discussion will be made on a method of calculating true reflectance on the basis of a true reflected-light quantity at a measurement point which is obtained by associating the measurement point and the surrounding points with a specified pixel and pixels surrounding the specified pixel in a single-band image, respectively. In this method, in order to remove an influence of the direction in which the surrounding points are positioned with respect to the measurement point, calculation for surrounding points are performed at every zone in the single-band image. It is thought that light reflected on the surrounding points at an infinite distance away from the measurement point can be ignored. For example, if an area including a measurement point corresponding to a specified pixel and surrounding points are included in a 5 μm square, it is known empirically that an influence of a surrounding point at about 100 μm or more away from the measurement point can be ignored, and in this case, it is enough that 19 zones are provided around the specified pixel.

First, incident light quantity Scm which corresponds to a value of a specified pixel in a calibration single-band image can be expressed by Eq. 2 where Scr0 represents true reflected-light quantity from a measurement point, a0 represents a correction factor with respect to the measurement point, Scrj represents average reflected-light quantity of surrounding points included in a zone j on a calibration substrate and aj represents a correction factor with respect to the surrounding points included in the zone j:

$$Scm = a0*Scr0 + a1*Scr1 + a2*Scr2 + \ldots + aj*Scrj \quad \text{Eq. 2}$$

Since it is thought that all the true reflected-light quantities at the measurement point and the surrounding points on the calibration substrate are equal (Scr0=Scrj), the true reflected-light quantity Scr0 from the measurement point can be expressed by Eq. 3:

$$Scr0 = Scm/(a0 + a1 + a2 + \ldots + aj) \quad \text{Eq. 3}$$

Next, incident light quantity Ssm which corresponds to a value of a specified pixel in a measurement single-band image can be expressed by Eq. 4 where Ssr0 represents true reflected-light quantity from a measurement point, a0 represents a correction factor with respect to the measurement point, Ssrj represents average reflected-light quantity of surrounding points included in the zone j on an objective substrate 9 and aj represents a correction factor with respect to the surrounding points included in the zone j:

$$Ssm = a0*Ssr0 + a1*Ssr1 + a2*Ssr2 + \ldots + aj*Ssrj \quad \text{Eq. 4}$$

By transforming Eq. 4, the true reflected-light quantity Ssr0 at the measurement point on the objective substrate 9 can be expressed by Eq. 5:

$$Ssr0 = (Ssm - a1*Ssr1 - a2*Ssr2 - \ldots - aj*Ssrj)/a0 \quad \text{Eq. 5}$$

Accordingly, a true reflectance Ref1 at the measurement point of the objective substrate 9 which corresponds to the specified pixel in the measurement single-band image can be expressed by Eq. 6:

$$\begin{aligned}Ref1 &= Ssr0/Scr0 \\ &= (a0 + a1 + a2 + \cdots + aj)* \\ &\quad (Ssm - a1*Ssr1 - a2*Ssr2 - \cdots - aj*Ssrj)/ \\ &\quad (Scm*a0)\end{aligned} \quad \text{Eq. 6}$$

In Eq. 6, the true reflectance can be obtained on the basis of the calibration single-band image and the measurement single-band image, assuming that the incident light quantity Scm is a value of the specified pixel in the calibration single-band image, the incident light quantity Ssm is a value of the specified pixel in the measurement single-band image, the reflected-light quantity Scrj approximates to an average value of the pixel values included in the zone j in the calibration single-band image and the reflected-light quantity Ssrj approximates to an average value of the pixel values included in the zone j in the measurement single-band image. The spectral reflectance calculation part 52 performs calculation of a reflectance in accordance with Eq. 6 for each of a plurality of measurement single-band images, to obtain a reflectance for each wavelength. From each pixel value in the single-band image, however, a pixel value of a corresponding dark image is subtracted in advance.

Thus, the spectral reflectance calculation part 52 corrects the value of the specified pixel for each of the measurement single-band images by using values of the specified pixel and the pixels surrounding the specified pixel and a plurality of correction factors (Step S16), and substantially performs an operation for calculating a reflectance at a position on the objective substrate 9 which corresponds to the specified pixel on the basis of the corrected value of the specified pixel (Step S17). Since it is thought that all the pixel values in the calibration single-band image are equal as discussed above, by dividing the both sides of Eq. 4 by the pixel value in the calibration single-band image, such an equation as ((reflectance on value of only specified pixel)=(influence of true reflectance at measurement point)+(influence of reflectances at surrounding points)) is conceptually held.

Figure 9:
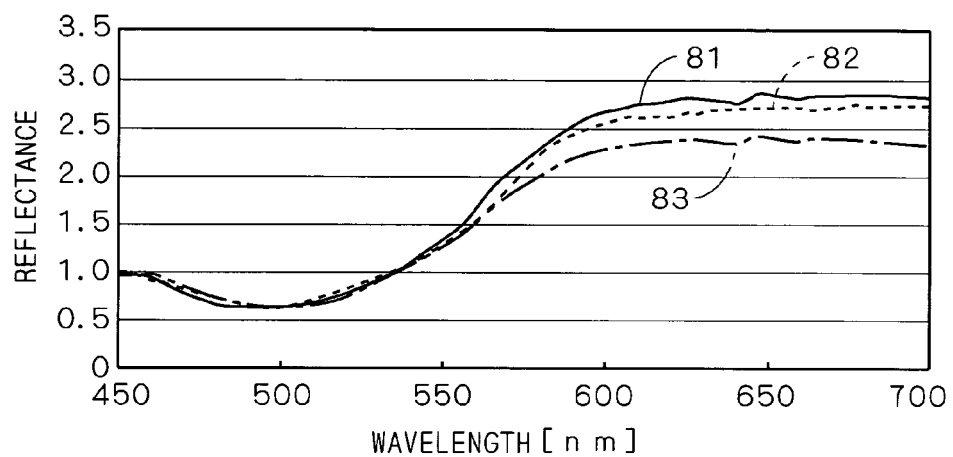
FIGS. 9 and 10 are graphs each showing spectral reflectance of an objective substrate.
Figure 10:
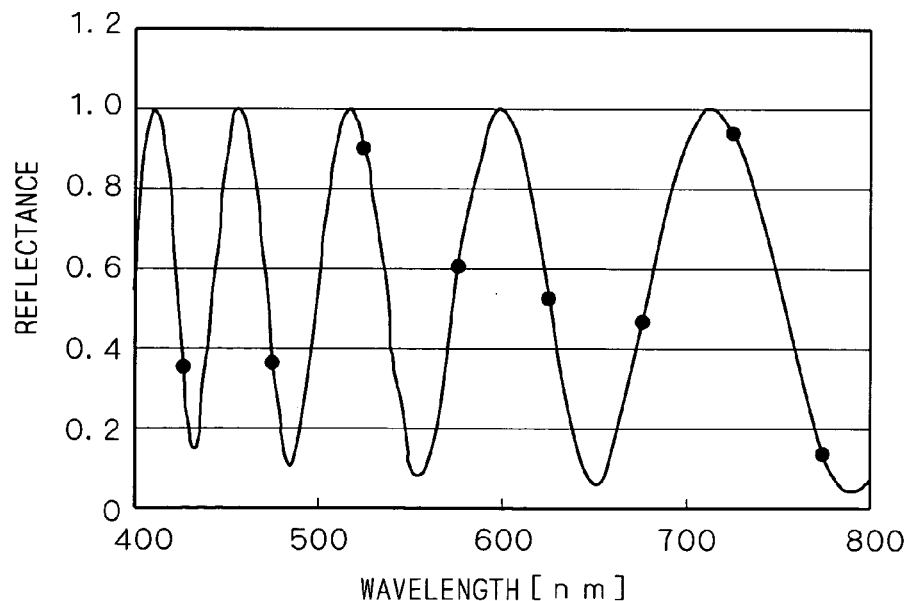

FIG. 9 is a graph showing exemplary measurement of spectral reflectance of the pattern 71 on the objective substrate 9. In FIG. 9, the line 81 indicates spectral reflectance obtained in the above operation by the spectral reflectance calculation part 52, the line 82 indicates theoretical spectral reflectance obtained by using a theoretical equation of reflectance as discussed later on the basis of the film structure on the objective substrate 9 and the line 83 indicates spectral reflectance obtained without the above correction (i.e., the spectral reflectance obtained by using the value of the specified pixel without changing). It can be seen from FIG. 9 that the spectral reflectance which approximates to the theoretical spectral reflectance can be obtained by the spectral reflectance calculation part 52. Actually, however, as shown in FIG. 10, since the reflectances are discretely calculated for a plurality of different wavelengths, the spectral reflectance is obtained as a function of the wavelengths by connecting discrete points in a predetermined manner. Naturally, a plurality of reflectances which are discretely obtained can be regarded as one spectral reflectance.

After the spectral reflectance is obtained, a film thickness calculation part 53 calculates the thickness of a film (or thicknesses of films) formed on the objective substrate 9 on the basis of the spectral reflectance (Step S18). For example, a plurality of reference spectral reflectances which correspond to a plurality of film thicknesses are prepared in advance by performing simulation with the film thickness changed on the basis of the theoretical equation of reflectance as discussed later, and one of the reference spectral reflectances which approximates most to the spectral reflectance obtained by the spectral reflectance calculation part 52 is specified. Then, the film thickness in correspondence with the specified reference spectral reflectance is outputted and the thickness of the film formed on the objective substrate 9 is obtained.

Figure 11:
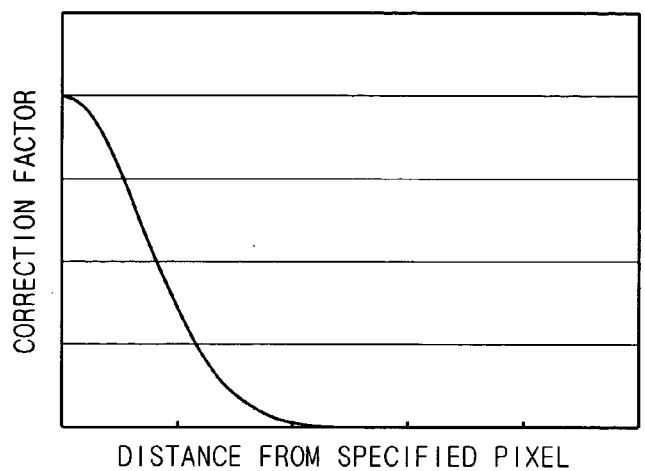
FIG. 11 is a graph showing a relation in outline between a correction factor and a distance from a specified pixel.

Next, an operation for setting correction factors in Step S13 will be discussed. FIG. 11 is a graph showing a relation in outline between a correction factor and a distance from a specified pixel. As discussed above, if the value of the specified pixel in the single-band image is based on the sum of products obtained by multiplying each of the true reflected-light quantities at the measurement point and the surrounding points (actually, those at the surrounding points are average reflected-light quantities form zones) by one of the correction factors in accordance with the distances from the measurement point, it is thought that ideally, the correction factors which are degrees of influence on the specified pixel from the measurement point and the surrounding points becomes smaller as the distances from the specified pixel (i.e., the distances from the measurement point) increases, as shown in FIG. 11.

On the other hand, with respect to the calibration substrate, since all the true reflected-light quantities at the measurement point and the surrounding points are equal as discussed above and it is thought that all the incident light quantities corresponding to the pixel values in the calibration single-band image are equal, the condition of Eq. 7 is derived as (Scr0=Scm) in Eq. 3:

$$a0+a1+a2+\ldots+aj=1 \qquad \text{Eq. 7}$$

Accordingly, when a plurality of candidates of correction factors (hereinafter, referred to as "a group of candidate factors") on the basis of the relation of FIG. 11 are inputted by a user while the condition of Eq. 7 is satisfied, the group of candidate factors inputted by the correction factor setting part 51 is set to Eq. 6 in Step S13. Then, calculation is performed on the basis of the pixel values obtained from each reference single-band image, and an evaluation value representing the degree of approximation between the calculation result from the inputted group of candidate factors and the theoretical spectral reflectance.

The theoretical spectral reflectance of the reference substrate 9a can be obtained from Eq. 8 on the basis of the known film information. In Eq. 8, $n_0$ represents a refractive index of air, $n_1$ represents a refractive index of a thin film, $n_2$ represents a refractive index of a substrate, d represents a film thickness and $\lambda$ represents a wavelength.

$$R = 1 - \frac{8 n_0 n_1^2 n_2}{(n_0^2 + n_1^2)(n_1^2 + n_2^2) + 4 n_0 n_1^2 n_2 + (n_0^2 - n_1^2)(n_1^2 - n_2^2)\cos 2\delta_1} \qquad \text{Eq. 8}$$

$$\text{where } \delta_1 = \frac{2\pi}{\lambda} n_1 d$$

The user repeats change of the group of candidate factors (try and error) on the basis of the evaluation value, and when an evaluation value larger than a predetermined value is obtained, the group of candidate factors is set as a plurality of correction factors used in the spectral reflectance calculation part 52. The spectral reflectance on the reference substrate 9a which is obtained in advance by using an external film thickness measurement apparatus adopting a light interferometric method or the like may be used instead of the theoretical spectral reflectance.

Thus, in the film thickness measurement apparatus 1 of FIG. 1, a plurality of correction factors are set by using a plurality of reference single-band images representing a predetermined pattern on the reference substrate 9a while the image pickup part 32 used for positioning the objective substrate 9 acquires a plurality of measurement single-band images corresponding to a plurality of wavelengths, respectively, representing the same pattern on the objective substrate 9 as that on the reference substrate 9a. Then, the value of the specified pixel for each measurement single-band image is corrected by using the pixel values and the correction factors, and reflectances are calculated on the basis of the corrected values. The film thickness measurement apparatus 1 can thereby achieve a measurement of spectral reflectance with respect to the predetermined pattern on the objective substrate 9 on the basis of a plurality of measurement single-band images with high accuracy. As a result, it is possible to obtain the thickness of a film formed on the objective substrate 9 with high accuracy by using the image pickup part 32 which is originally used for moving the objective substrate 9. The film thickness measurement apparatus 1 of the present preferred embodiment, in which the correction factors are prepared for each pattern, is especially suitable for an inspection in a manufacturing process for semiconductor products which are produced in small variety and large quantity.

In the film thickness measurement apparatus 1, in order to simplify the operations of the correction factor setting part 51 and the spectral reflectance calculation part 52, values of a plurality of pixels which are present at the same distance away from the specified pixel (in other words, a plurality of pixels constituting one zone) are replaced by an average value as one representative value, but the representative value may be a median of the pixel values or the like. If there is no trouble in the processings of the correction factor setting part 51 and the spectral reflectance calculation part 52, the operation may be performed with a correction factor calculated for each pixel value.

Figure 12:
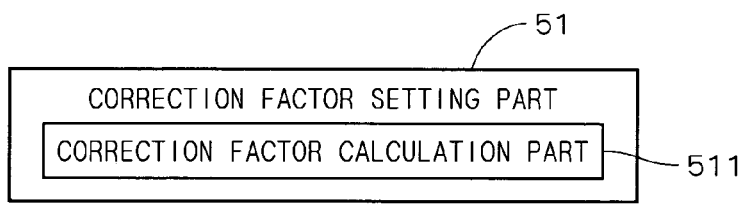
FIG. 12 is a diagram showing a correction factor calculation part.

Next, another exemplary operation for setting the correction factors in Step S13 will be discussed. FIG. 12 is a diagram showing a correction factor calculation part 511 provided in the correction factor setting part 51. In the correction factor calculation part 511, predetermined simultaneous equations are solved on the basis of each of a plurality of reference single-band images to obtain a plurality of correction factors, and then the correction factor setting part 51 sets the correction factors in the spectral reflectance calculation part 52. Hereafter, discussion will be made on a method of calculating a plurality of correction factors in the correction factor calculation part 511, referring to equations.

First, by dividing both sides of Eq. 4 by a pixel value of a calibration single-band image, a reflectance $A_i$ which is obtained by using a not-corrected value of a specified pixel in a reference single-band image of wavelength i is expressed as Eq. 9 where $B_i$ represents a theoretical reflectance of the reference substrate 9a in the wavelength i, a0 represents a correction factor with respect to the measurement point, $C_{ij}$ represents an average reflectance with respect to the zone j and aj represents a correction factor with respect to the zone j:

$$A_i = a0 * B_i + \sum_j aj * C_{ij} \qquad \text{Eq. 9}$$

When there are p zones set in a single-band image, since it is necessary to obtain (p+1) correction factors a0 and aj, (p+1) reference single-band images of different wavelengths are acquired in Step S12. In the correction factor calculation part 511, (p+1) equations are generated in accordance with Eq. 9 on the basis of the (p+1) reference single-band images. Eq. 10 represents simultaneous equations constituted of (p+1) equations in matrix, where $M_A$ represents a matrix of reflectances obtained by using the not-corrected values of the specified pixels, $M_C$ represents a matrix of theoretical reflectances and average reflectances with respect to the zone j and $M_a$ represents a matrix of correction factors:

$$M_A = M_C \cdot M_a \text{ where} \qquad \text{Eq. 10}$$

$$M_A = \begin{bmatrix} A_1 \\ A_2 \\ \vdots \\ A_{p+1} \end{bmatrix}, M_C = \begin{bmatrix} B_1 & C_{11} & \cdots & C_{1p} \\ B_2 & C_{21} & & \\ \vdots & \vdots & \ddots & \\ B_{p+1} & C_{p+11} & & C_{p+1p} \end{bmatrix},$$

$$\text{and } M_a = \begin{bmatrix} a0 \\ a1 \\ \vdots \\ ap \end{bmatrix}$$

When nine zones are set in a single-band image, for example, assuming that the matrix $M_A$ of reflectances on the basis of ten reference single-band images and the values of the specified pixels from Eq. 8 and the matrix $M_C$ of theoretical reflectances and average reflectances with respect to the zone j are acquired as shown in Eq. 11, the matrix $M_a$ of correction factors can be obtained as shown in Eq. 12 by substituting $M_A$ and $M_C$ into Eq. 10:

$$M_A = \begin{bmatrix} 2.56 \\ 2.49 \\ 2.38 \\ 2.38 \\ 2.51 \\ 2.47 \\ 2.24 \\ 1.68 \\ 1.31 \\ 1.03 \end{bmatrix} \quad \text{Eq. 11}$$

$$M_C = \begin{bmatrix} 2.73 & 2.61 & 2.61 & 2.43 & 1.85 & 1.28 & 1.07 & 1.04 & 0.99 & 0.96 \\ 2.68 & 2.56 & 2.56 & 2.31 & 1.60 & 0.89 & 0.68 & 0.65 & 0.54 & 0.49 \\ 2.61 & 2.44 & 2.45 & 2.20 & 1.42 & 0.64 & 0.43 & 0.40 & 0.29 & 0.23 \\ 2.62 & 2.45 & 2.45 & 2.24 & 1.56 & 0.88 & 0.68 & 0.67 & 0.60 & 0.58 \\ 2.59 & 2.54 & 2.51 & 2.36 & 1.88 & 1.38 & 1.21 & 1.18 & 1.15 & 1.17 \\ 2.52 & 2.50 & 2.50 & 2.33 & 1.95 & 1.57 & 1.41 & 1.40 & 1.40 & 1.40 \\ 2.27 & 2.25 & 2.25 & 2.09 & 1.77 & 1.41 & 1.26 & 1.23 & 1.23 & 1.23 \\ 1.71 & 1.73 & 1.73 & 1.57 & 1.22 & 0.90 & 0.75 & 0.72 & 0.69 & 0.69 \\ 1.38 & 1.32 & 1.30 & 1.20 & 0.88 & 0.60 & 0.48 & 0.45 & 0.43 & 0.44 \\ 1.08 & 1.04 & 1.03 & 0.96 & 0.80 & 0.65 & 0.59 & 0.57 & 0.57 & 0.59 \end{bmatrix}$$

$$M_a = \begin{bmatrix} -0.16 \\ 2.84 \\ -1.82 \\ -0.17 \\ 0.83 \\ -0.99 \\ 0.87 \\ -1.53 \\ 2.22 \\ -1.11 \end{bmatrix} \quad \text{Eq. 12}$$

Figure 13:
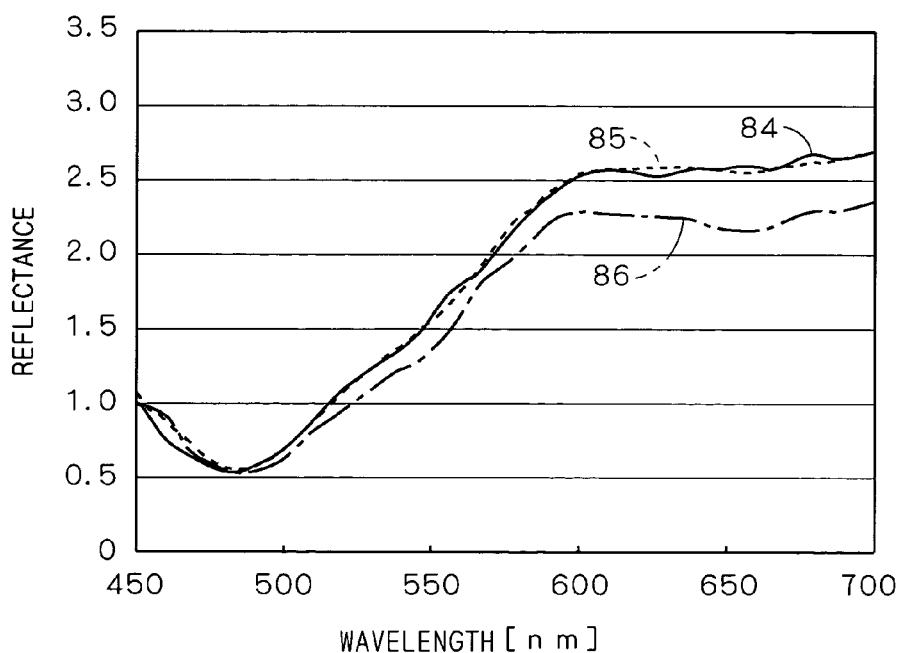
FIG. 13 is a graph showing spectral reflectance of an objective substrate.

FIG. 13 is a graph showing spectral reflectance on the objective substrate 9, which is obtained by using the correction factors shown in Eq. 12. In FIG. 13, the line 84 indicates spectral reflectance obtained by using the correction factors, the line 85 indicates theoretical spectral reflectance and the line 86 indicates spectral reflectance on the basis of values of only a specified pixel. It can be seen from FIG. 13 that a result which approximates more to the theoretical spectral reflectance can be obtained by calculation of the spectral reflectance, using the correction factors obtained in the correction factor calculation part 511. Though the correction factors ideally include no negative value, the correction factors in Eq. 12 include some negative values. Then, by using these correction factors, calculation of the spectral reflectance with high accuracy as shown in FIG. 13 can be achieved. Though it is not clear why such a phenomenon occurs, this is probably caused by at least an effect of the matrix $M_a$ of correction factors which is obtained as being inherent in a pattern.

Though calculation of correction factors is performed on the basis of the reflectances obtained by dividing the pixel values of the reference single-band image by the pixel values of the calibration single-band image in the above operation, the correction factors can be calculated without converting the pixel values of the reference single-band image into reflectances. In other words, both when the reflectance is used and when the pixel value is used without conversion, basically, a principle is used that calculation to obtain a plurality of correction factors is performed, where it is assumed, in each of a plurality of reference single-band images, that the correction factors are unknown, by substantially multiplying each of the already-known corrected value of the specified pixel corresponding to the theoretical reflectance and values of pixels surrounding the specified pixel by one of the correction factors to obtain an equation where the sum of a plurality of products (multiplication results) is assumed to be the value of the specified pixel and then by solving simultaneous equations obtained from a plurality of reference single-band images, and the film thickness measurement apparatus 1 having the correction factor calculation part 511 can thereby measure the spectral reflectance of the objective substrate 9 with high accuracy.

Next, another preferred embodiment of the film thickness measurement apparatus 1 will be discussed. FIGS. 14A and 14B are views illustrating patterns 71a and 71b, respectively, different from the pattern 71 of FIG. 5, which are formed on the reference substrate 9a. In the film thickness measurement apparatus 1 of this preferred embodiment, after a plurality of reference single-band images corresponding to a plurality of wavelengths on the pattern 71 are acquired (Steps S11 and S12), similarly with respect to the patterns 71a and 71b, a plurality of reference single-band images corresponding to a plurality of wavelengths are acquired. In an actual case, a plurality of reference single-band images representing different patterns in a plurality of wavelengths are acquired as much as the number of correction factors.

Subsequently, with try and error by the user or calculation by the correction factor calculation part 511, a plurality of correction factors are obtained for each wavelength and then the correction factor setting part 51 sets the correction factors for each wavelength (Step S13). Specifically, though the early-discussed correction factors are obtained depending on the pattern, the correction factors are obtained herein depending on the wavelength. In calculation of the correction factors by the correction factor calculation part 511, the simultaneous equations of Eq. 9 are obtained using a plurality of single-band images which are acquired by irradiating a plurality of patterns with light of a specified wavelength and the simultaneous equations are solved to obtain a plurality of correction factors of the specified wavelength.

After the setting of the correction factors is finished, th objective substrate 9 is put onto the stage 2 and a plurality of measurement single-band images at a measurement point are acquired (Steps S14 and S15). The spectral reflectance calculation part 52 selects a plurality of correction factors to be used for calculation in accordance with the wavelength of each measurement single-band image, corrects a value of a specified pixel and obtains a true spectral reflectance by using the corrected value of the specified pixel (Steps S16 and S17). Then, the thickness of a film formed on the objective substrate 9 is measured on the basis of the true spectral reflectance (Step S18).

Thus, in the film thickness measurement apparatus 1 of this preferred embodiment, a plurality of reference single-band images representing different patterns in a wavelength are acquired by the image pickup part 32 which is originally used for positioning of the objective substrate 9, and a plurality of correction factors are thereby set for each wavelength. This makes it possible to measure the spectral reflectance of the objective substrate 9 not depending on a pattern and allows highly-accurate measurement of the thickness of a film formed on the objective substrate 9. The film thickness measurement apparatus 1 of this preferred embodiment, in which a plurality of correction factors not depending on a pattern, is especially suitable for an inspection in a manufacturing process for semiconductor products which are produced in large variety and small quantity.

A plurality of reference single-band images representing different patterns may include a plurality of images acquired with a position of one pattern changed by moving the reference substrate 9a. This allows a plurality of reference single-band images to be easily acquired.

Though the preferred embodiments of the present invention have been discussed above, the present invention is not limited to the above-discussed preferred embodiments, but allows various variations.

In the above-discussed preferred embodiments, a plurality of correction factors are obtained for each pattern or each wavelength, but if high accuracy in measurement of the spectral reflectance and film thickness is not required, a plurality of correction factors may be obtained regardless of pattern or wavelength on the basis of a plurality of reference single-band images which are not separated by patterns or wavelengths. Even in this case, it is thought that a plurality of correction factors for correcting the influence of the S-V effect are attributed to the optical system 33, the measurement of spectral reflectance and film thickness can be performed appropriately. A plurality of correction factors may be obtained by a statistical technique on the basis of a lot of reference single-band images.

In a single-band image, a specified pixel is not necessarily a central pixel and the reflectances of a plurality of measurement points on the substrate 9 corresponding to a plurality of pixels other than the specified pixel may be obtained by the similar calculation from the same measurement single-band images. In this case, a plurality of correction factors corresponding to these pixels may be newly obtained or the correction factor on the specified pixel may be used.

The range of pixels surrounding the specified pixel used for calculation of reflectance is not limited to the range discussed in the above preferred embodiments but is decided as appropriate in accordance with the degree of influence on the specified pixel from the surrounding points.

Though the image pickup part 32, the correction factor setting part 51 and the spectral reflectance calculation part 52 perform the function of a spectral reflectance measurement apparatus in the film thickness measurement apparatus 1 of the above-discussed preferred embodiments, the spectral reflectance measurement apparatus may be provided in an apparatus other than the film thickness measurement apparatus. For example, by additionally providing the correction factor setting part, the spectral reflectance calculation part and the filter unit in a substrate processing apparatus having the image pickup part, the function of the spectral reflectance measurement apparatus may be added to the substrate processing apparatus. Further, by additionally providing the film thickness calculation part in the substrate processing apparatus, the function of the film thickness measurement apparatus may be implemented together with the substrate moving mechanism and the control part for controlling the substrate moving mechanism. Instead of moving the substrate, an optical head integrated in the image pickup part 32 may be moved. In this case, the film thickness can be obtained by using the image pickup part which moves relatively to the substrate on the basis of the acquired image.

The substrate 9 is not limited to a semiconductor substrate but may be a glass substrate, a printed circuit board or the like. Especially, the reference substrate 9a may be a substrate formed of Cu (copper) or Al (aluminum). The object to be measured by the film thickness measurement apparatus 1 may be a film formed on a substance other than a substrate on which a pattern is formed.

While the invention has been shown and described in detail, the foregoing description is in all aspects illustrative and not restrictive. It is therefore understood that numerous modifications and variations can be devised without departing from the scope of the invention.

What is claimed is:

1. A spectral reflectance measurement apparatus for measuring spectral reflectance of a measurement object, comprising:

an image pickup part for picking up an image of an object to acquire a plurality of single-band images corresponding to a plurality of wavelengths;

a correction factor setting part for setting a plurality of correction factors in accordance with distances from a specified pixel by using a plurality of reference single-band images of a reference object which are acquired by said image pickup part; and a spectral reflectance calculation part for obtaining a corrected value of a specified pixel for each of a plurality of measurement single-band images of a predetermined area on a measurement object which are acquired by said image pickup part, by using a value of said specified pixel, values of pixels surrounding said specified pixel and said plurality of correction factors and calculating a reflectance of a position on said measurement object which corresponds to said specified pixel on the basis of said corrected value.

2. The spectral reflectance measurement apparatus according to claim 1, wherein said correction factor setting part comprises a correction factor calculation part for performing calculation to obtain said plurality of correction factors, where it is assumed, in each of said plurality of reference single-band images, that said plurality of correction factors are unknown, by substantially multiplying each of an already-known corrected value of said specified pixel and values of pixels surrounding said specified pixel by one of said plurality of correction factors to obtain an equation where the sum of a plurality of multiplication results is assumed to be a value of said specified pixel and then solving simultaneous equations obtained from said plurality of reference single-band images.

3. The spectral reflectance measurement apparatus according to claim 1, wherein said plurality of reference single-band images are images representing a predetermined pattern on said reference object in different wavelengths and said plurality of measurement single-band images represent said predetermined pattern.

4. The spectral reflectance measurement apparatus according to claim 1, wherein said plurality of reference single-band images are images representing different patterns in one wavelength and said correction factor setting part performs setting of said plurality of correction factors for each wavelength, and said spectral reflectance calculation part selects correction factors to be used in calculation in accordance with the wavelength of a measurement single-band image.

5. The spectral reflectance measurement apparatus according to claim 4, wherein a plurality of images obtained with a position of one pattern changed are included in said plurality of reference single-band images.

6. The spectral reflectance measurement apparatus according to claim 1, wherein values of a plurality of pixels which are present at the same distance away from said specified pixel are replaced by one representative value to be used in said correction factor setting part and said spectral reflectance calculation part.

7. The spectral reflectance measurement apparatus according to claim 1, further comprising:
a light source for emitting light of multiple wavelengths;
an optical system for guiding light from said light source onto an object and guiding light reflected on said object to said image pickup part; and
a filter unit having a plurality of filters for transmitting lights of a plurality of different wavelengths, where one of said plurality of filters is selectively disposed on an optical path leading from said light source to an object.

8. A film thickness measurement apparatus for measuring the thickness of a film formed on a measurement object, comprising:
an image pickup part for picking up an image of an object to acquire a plurality of single-band images corresponding to a plurality of wavelengths;
a moving mechanism for moving an object relatively to said image pickup part;
a control part for controlling said moving mechanism on the basis of an image acquired by said image pickup part;
a correction factor setting part for setting a plurality of correction factors in accordance with distances from a specified pixel by using a plurality of reference single-band images of a reference object which are acquired by said image pickup part;
a spectral reflectance calculation part for obtaining a corrected value of a specified pixel for each of a plurality of measurement single-band images of a predetermined area on a measurement object which are acquired by said image pickup part, by using a value of said specified pixel, values of pixels surrounding said specified pixel and said plurality of correction factors and calculating a reflectance of a position on said measurement object which corresponds to said specified pixel on the basis of said corrected value; and
a film thickness calculation part for calculating the thickness of a film formed on said measurement object on the basis of reflectances obtained by said spectral reflectance calculation part.

9. The film thickness measurement apparatus according to claim 8, wherein said correction factor setting part comprises a correction factor calculation part for performing calculation to obtain said plurality of correction factors, where it is assumed, in each of said plurality of reference single-band images, that said plurality of correction factors are unknown, by substantially multiplying each of an already-known corrected value of said specified pixel and values of pixels surrounding said specified pixel by one of said plurality of correction factors to obtain an equation where the sum of a plurality of multiplication results is assumed to be a value of said specified pixel and then solving simultaneous equations obtained from said plurality of reference single-band images.

10. The film thickness measurement apparatus according to claim 8, wherein said plurality of reference single-band images are images representing a predetermined pattern on said reference object in different wavelengths and said plurality of measurement single-band images represent said predetermined pattern.

11. The film thickness measurement apparatus according to claim 8, wherein said plurality of reference single-band images are images representing different patterns in one wavelength and said correction factor setting part performs setting of said plurality of correction factors for each wavelength, and
said spectral reflectance calculation part selects correction factors to be used in calculation in accordance with the wavelength of a measurement single-band image.

12. The film thickness measurement apparatus according to claim 11, wherein a plurality of images obtained with a position of one pattern changed are included in said plurality of reference single-band images.

13. The film thickness measurement apparatus according to claim 8, wherein values of a plurality of pixels which are present at the same distance away from said specified pixel are replaced by one representative value to be used in said correction factor setting part and said spectral reflectance calculation part.

14. The film thickness measurement apparatus according to claim 8, further comprising:
a light source for emitting light of multiple wavelengths;
an optical system for guiding light from said light source onto an object and guiding light reflected on said object to said image pickup part; and
a filter unit having a plurality of filters for transmitting lights of a plurality of different wavelengths, where one of said plurality of filters is selectively disposed on an optical path leading from said light source to an object.

15. A spectral reflectance measurement method for measuring spectral reflectance of a measurement object, comprising the steps of:
picking up images of a reference object to acquire a plurality of reference single-band images;
setting a plurality of correction factors in accordance with distances from a specified pixel by using said plurality of reference single-band images;
picking up images of a predetermined area on a measurement object to acquire a plurality of measurement single-band images corresponding to a plurality of wavelengths;
obtaining a corrected value of a specified pixel for each of said plurality of measurement single-band images by using a value of said specified pixel, values of pixels surrounding said specified pixel and said plurality of correction factors; and
calculating a reflectance of a position on said measurement object which corresponds to said specified pixel on the basis of said corrected value, the calculated reflectance being stored on a computer medium.

16. The spectral reflectance measurement method according to claim 15, wherein said plurality of correction factors are calculated, where it is assumed, in each of said plurality of reference single-band images, that said plurality of correction factors are unknown, by substantially multiplying each of an already-known corrected value of said specified pixel and values of pixels surrounding said specified pixel by one of said plurality of correction factors to obtain an equation where the sum of a plurality of multiplication results is assumed to be a value of said specified pixel and then solving simultaneous equations obtained from said plurality of reference single-band images in said step of setting a plurality of correction factors.

17. The spectral reflectance measurement method according to claim 15, wherein said plurality of reference single-band images are images representing a predetermined pattern on said reference object in different wavelengths and said plurality of measurement single-band images represent said predetermined pattern.

18. The spectral reflectance measurement method according to claim 15, wherein said plurality of reference single-band images are images representing different patterns in one wavelength and said step of setting a plurality of correction factors is executed for each wavelength, and
 correction factors to be used in calculation are selected in accordance with the wavelength of a measurement single-band image in said step of calculating a reflectance.

19. The spectral reflectance measurement method according to claim 18, wherein a plurality of images obtained with a position of one pattern changed are included in said plurality of reference single-band images.

20. The spectral reflectance measurement method according to claim 15, wherein values of a plurality of pixels which are present at the same distance away from said specified pixel are replaced by one representative value to be used in said steps of setting a plurality of correction factors and calculating a reflectance.

* * * * *